United States Patent
Faeth

(10) Patent No.: US 7,321,358 B2
(45) Date of Patent: Jan. 22, 2008

(54) POINTING STICK WITH FUNCTION PAD FOR TWO HANDED OPERATION

(76) Inventor: Michael G. Faeth, 5052 N. Wishon-B, Fresno, CA (US) 93704

( * ) Notice: Subject to any disclaimer, the term of this patent is extended or adjusted under 35 U.S.C. 154(b) by 72 days.

(21) Appl. No.: 11/213,369

(22) Filed: Aug. 26, 2005

(65) Prior Publication Data

US 2006/0007138 A1 Jan. 12, 2006

Related U.S. Application Data

(63) Continuation-in-part of application No. 10/754,864, filed on Jan. 8, 2004, now abandoned.

(60) Provisional application No. 60/440,216, filed on Jan. 14, 2003.

(51) Int. Cl.
G09G 5/00 (2006.01)
(52) U.S. Cl. ........................ 345/156; 345/157
(58) Field of Classification Search ................ 345/156, 345/157, 158, 159, 160–173; 463/38, 37
See application file for complete search history.

(56) References Cited

U.S. PATENT DOCUMENTS

| | | | |
|---|---|---|---|
| 4,816,810 A | 3/1989 | Moore | |
| 5,421,590 A | 6/1995 | Robbins | |
| 5,572,238 A | 11/1996 | Krivacic | |
| 5,838,305 A | 11/1998 | Bookstein | |
| 5,838,307 A * | 11/1998 | Bouton | 345/168 |
| 6,025,830 A | 2/2000 | Cohen | |
| 6,342,009 B1 | 1/2002 | Soma | |
| 6,441,805 B1 | 8/2002 | Reid et al. | |
| 6,489,948 B1 | 12/2002 | Lau | |
| 6,545,664 B1 | 4/2003 | Kim | |
| 6,567,073 B1 | 5/2003 | Levin | |
| 6,591,308 B1 * | 7/2003 | Cummings et al. | 710/1 |
| 6,697,251 B1 * | 2/2004 | Aisenberg | 361/683 |
| 6,963,935 B1 * | 11/2005 | Young et al. | 710/29 |
| 2002/0175894 A1 | 11/2002 | Grillo | |
| 2005/0262273 A1 * | 11/2005 | Kikuchi et al. | 710/12 |

* cited by examiner

Primary Examiner—Nitin I. Patel
(74) Attorney, Agent, or Firm—Barber Legal

(57) ABSTRACT

A computer input device has two modules, each module located at the natural resting position of one of the computer user's corresponding hands on a work surface. The first module has a pointing device, while the second module has a plurality of touch sensitive devices such as buttons or skin capacitance detectors. The second module is substantially flat and sends to the computer commands which translate to those of left and right clicks and/or scrolls. The first module has a pointing stick allowing easy hand access and further allowing the stick to be held in a pencil grip or with the thumb and opposing finger or fingers for pointing. The command translation and other variables may be programmed to suit the user's accessibility needs.

15 Claims, 18 Drawing Sheets

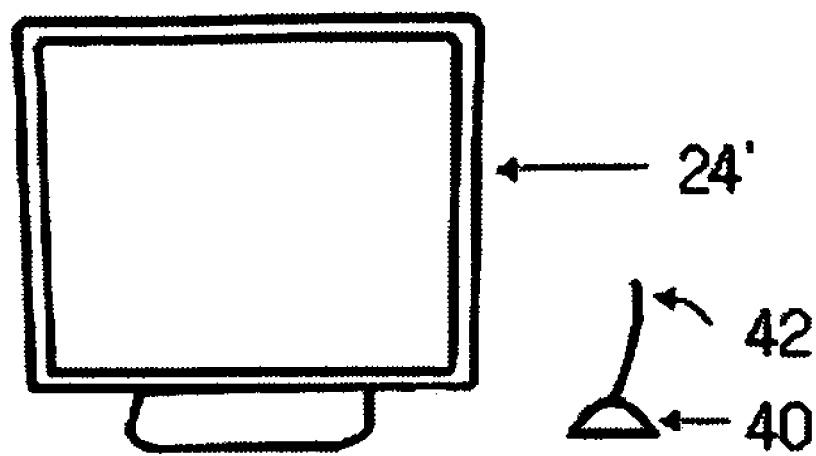
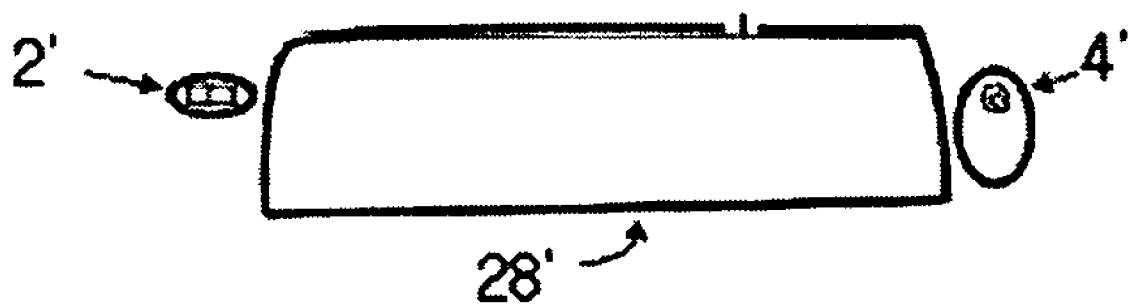
FIG. 3

POINTING STICK WITH FUNCTION PAD FOR TWO HANDED OPERATION

CROSS-REFERENCE TO RELATED APPLICATIONS

This invention claims the priority and benefit of U.S. Provisional Patent Application No. 60/440,216 filed Jan. 14, 2003 in the name of the same inventor, Michael Faeth, and entitled "TWO HAND COMPUTER INPUT DEVICE" and as disclosed in Disclosure Document No. 515675 dated Jul. 18, 2002 entitled "TWO-HAND COMPUTER INPUT DEVICE" in the name of the same inventor, Michael Faeth, and is a continuation-in-part application of U.S. patent application Ser. No. 10/754,864, presently accorded filing date Jan. 8, 2004 now abandoned, by the same inventor and also entitled "TWO HANDED COMPUTER INPUT DEVICE", the specifications of which are hereby incorporated by reference.

FIELD OF THE INVENTION

This invention relates generally to computer input devices and specifically to "point and click" devices such as the computer mouse.

STATEMENT REGARDING FEDERALLY FUNDED RESEARCH

This invention was not made under contract with an agency of the US Government, nor by any agency of the US Government.

BACKGROUND OF THE INVENTION

"Point and Click" functions have become very important in computer use in the last two decades, due to widespread acceptance of graphical user interfaces (GUI) and mouse-oriented software programs. Unfortunately, of the existing devices that enable users to send commands relating to such mousing functions to a computer, almost all are designed to be used in a one-handed manner. The common desktop mouse is a perfect example of this: moving the mouse creates "point" commands in the computer, while pushing buttons on the mouse activate the "click" functions. The mouse field is over-run with virtually identical devices on this system. Many incorporate extra features (scroll wheels, extra buttons, advanced motion tracking systems and so on) but few devices get a way from the basic idea of "point and click" combined into a single, one-handed device.

While there is convenience to one handed input, this method may become problematic in certain situations. For instance, one-handed mouse usage can actually contribute to a number of detrimental conditions when the user engages in continual, heavy mouse use. The user may be susceptible to developing discomfort, or worse: Carpal Tunnel Syndrome, Repetitive Motion Strain, and so on, problems which may occur in the hand, wrist, arm or elbow of the user. Certain types of programs in particular are more likely to cause or exacerbate this problem: computer generated graphics art programs, audio editing software, games, and certain other mouse-oriented software programs that can require great numbers of "point and click" tasks. In addition, the ergonomic aspects of the one handed mouse are less than ideal. For example, a common mouse usually requires a user to grasp the mouse with the entire hand while slightly bending the wrist upwards, and then to move the arm, wrist, and/or hand for pointing while simultaneously sending click commands with the fingers, usually of the same hand. In addition, usually the buttons found on a mouse are of a mechanical, non-sensitive nature, requiring a certain amount of force to depress. Herein this hand position, combination of tasks and required force lies the basic problem. Quite a large space must also be set aside for the mouse as it is moved around the desktop for pointing functions.

There are also accessibility issues related to mice, and various attempts which have been made to address such issues. For individuals with certain conditions or problems which make motion painful or reduce coordination, execution of both point and click functions on one hand may be exceedingly difficult or impossible.

One potentially useful solution to the ergonomic problems presented by the mouse is another device: the joystick. Humans have naturally used their opposing thumb and fingers to grasp tools, pens, pencils and paintbrushes throughout time, and some joysticks can be grasped in a similar fashion. This would allow the user a stationary device offering a more efficient means of pointing, using primarily just the fingers instead of the arm, hand and/or wrist associated with mouse pointing. Furthermore, joysticks usually have the ability to automatically continue the cursor in the same direction the stick is simply pointed to, resulting in a relatively small amount of distance for the fingers to move, whereas with a mouse, usually the mouse movement coordinates with the cursor movement to an exact amount (i.e., the cursor moves only as far as the mouse is moved, resulting in a relatively large amount of distance for the user to move the mouse).

However, considering the fingers and thumb are busy while grasping such a tool, they are not free to depress buttons conveniently like they are on a mouse. While some joysticks may have a trigger mechanism located where it is possible to depress it, or the ability to depress the stick itself to send a click command, solely operating a joystick of this type presents the same problem as mouse operation: a requirement for one handed pointing and clicking. Some joysticks, used for computer gaming, have been designed to be used with both hands, but they usually have buttons in a fixed position and require the user to pick up the device and hold it, which would be of great inconvenience to a user needing to input both keyboard and "point and click" commands, due to picking-up the joystick to use it and having to put it down again to use the keyboard. And so, it is an object of this invention to provide a single, stationary device that splits the "point and click" functions traditionally done with one hand onto two separate and freely re-positionable components for two hand operation: one hand using a pointing stick for pointing; one hand using zones or buttons for sending simultaneous clicking.

U.S. Patent Pub. No. 2002/0175894 dated Nov. 28, 2002 to Grillo entitled Hand Supported Mouse for Computer Input is one of the numerous devices which vary widely from normal standards but would seem to have little structure which could be used to oppose patentability on this invention. U.S. Pat. No. 6,545,664 dated Apr. 8, 2003 to Kim entitled Head Operated Computer Pointer is another example of this: it is mounted on the user's head.

U.S. Pat. No. 6,489,948 dated Dec. 3, 2002 to Lau entitled Computer Mouse Having Multiple Cursor Positioning Inputs and Method of Operation teaches a computer mouse having a trackball. It may have a joystick as well in the mouse. There is no provision for two units located at proper hand positions on either side of a keyboard.

U.S. Pat. No. 6,441,805 dated Aug. 27, 2002 to Reid et al entitled Ergonomic Computer Mouse is obviously related to human factors of hand comfort.

U.S. Pat. No. 6,342,009 dated Jan. 29, 2002 to Soma entitled Input Device for Game Machine is an example of something that exists in other forms as well: a single unit for use with two hands.

U.S. Pat. No. 4,816,810 dated Mar. 28, 1989 in the name of Moore and entitled Remote Acceptance Switch for Computer Mouse teaches a design in which an existing pointing device utilizing built-in primary buttons, usually a mouse, can be connected and disconnected to an adapter. The device has a first cable having a first coupler in the middle and a second coupler at the end plugged into a computer. A second cable has a single switch and a third coupler on it which allows the second cable to be plugged into the first coupler in the middle of the first cable. This prior art is different in that the circuitry relating to pointing and click commands is contained within an existing device, there are no provisions for using the adapter with an existing pointing device without built-in buttons, and there are no provisions for providing multiple zones or buttons for sending other commands, such as right clicks, scrolls, short-cuts, etc., from a secondary unit.

One family of devices which exist are those allowing two different "point and click" devices to be plugged into the same computer. While most personal computers have only a single dedicated mouse port, they normally also have several USB ports or various types of serial ports (RS-232, RS-232C, or other types of "legacy" ports) which allows more than one device to be plugged into the same computer. This is disadvantageous in that it requires the use of more than one port, and thus more than one software port within the machine operating system with concurrent increases in other computer resources such as processor cycles and memory.

Furthermore, such devices as there are tend to be designed to be used as a supplement to an existing input device or to limit the potential placements of the two point and click devices by integrating the two devices into a standard keyboard, thus permanently fixing the physical relationship of the point, click, and keyboard command input devices. The latter can be extremely aggravating, for example to left-handed users, individuals with handicaps and so on.

U.S. Pat. No. 6,567,073 dated May 20, 2003 to Levin entitled Ambidextrous Computer Mouse, however, is an example of a human factor design which deals with two handed usage: a mouse which can be used with either hand. The purpose and concept, and thus the structure, is different from the present invention.

U.S. Pat. No. 6,025,830 dated Feb. 15, 2000 to Cohen entitled Game Controller for Infants is mostly of interest since it is a sort of second controller for input, but it is not a joystick, nor a mouse, nor does it seem to share a port with the mouse it is used with.

U.S. Pat. No. 5,838,305 dated Nov. 17, 1998 to Bookstein entitled Foot-Operated Control Mechanism for Computers is another ergonomics related device of little obvious relationship to the present invention.

U.S. Pat. No. 5,572,238 dated Nov. 5, 1996 to Krivacic entitled Computer User Interface for Non-Dominant Hand Assisted Control is of interest. It teaches a secondary pointing device, however apparently using two different ports for two pointing devices, so it seems to be different than the present invention.

U.S. Pat. No. 5,421,590 dated Jun. 6, 1995 to Robbins entitled Multiple Linked Game Controllers is of interest as it shows multiple joysticks entering one port of a game system. Since game systems are now safely removed from computer systems, this is different in art. Structurally, it also lacks provision of two units on each side of a keyboard (since it teaches away from keyboards), and does not teach separation of pointing and clicking structures onto separate modules. This is also designed so two players can play simultaneously and together.

One problem with some such devices is that they rely upon software in the computer to recognize mouse commands which differ from normal. This means that in moving from one computer to another, the user of such devices must install software to run the new device before being able to use the new device. This lack of portability is an issue: it would be better to provide a device which can move from computer to computer and act as a physical mouse. However, also providing software could be advantageous in making certain customizations possible, such as cursor acceleration, cursor speed, zone programming, etc.; or, the modules themselves could contain a means to control such attributes.

It would be beneficial to provide a single device which would allow heavy computer users, for specific example, users in the computer graphic arts field, a more natural and less labor intensive method of pointing and clicking with a two handed but single port device. Such a device should allow pointing functions to occur with a first hand and allow multiple commands (i.e., single click, right click, scrolls, click-drag, short-cuts, etc.) to occur simultaneously by use of the second hand. An alternative option would be allowing occasional single click and/or click-drag commands to occur with the first hand by means of a button, method or zone located on or near the first hand's module. This option would be if only to allow the convenience of one hand input if, for example, the computer user is holding a phone in one hand while working on the computer, the first hand will be able to point and click with convenience; or, if only to allow the computer user to depress a keyboard command with the second hand, while pointing, click-dragging with first hand.

It would further be beneficial to allow the actions with each hand located at its own convenient location on the work surface in front of the user.

It would further be beneficial to allow the clicking functions to occur in a substantially flat device for hand comfort.

SUMMARY OF THE INVENTION

General Summary

A computer input device has two modules, each module located at the natural resting position of one of the computer user's corresponding hands on a work surface. The first module has a pointing device, while the second module is a flat function pad which has a number of touch sensitive devices such as buttons or touch pads, skin capacitance detectors, scroll wheels, etc. By this means, users who spend a great deal of time on the computer may easily input "point and click" commands by using one hand to point and the other hand to click, thus splitting up the point and click effort between two hands. Connections may be established wirelessly.

The function pad is substantially flat, so as to rest in an ergonomic position beneath the user's hand. In addition it contains a number of touch sensitive zones positioned to allow ease of use by the index finger or different fingers, as users may very much desire or even need to use certain fingers for certain types of commands such as "single click" and "double click." Users may rest their finger and/or fingers on the zones after initial command activation and simply lift and replace their finger to send another command. An exception may be a zone that is programmed for a "click-drag" command, which would allow the command to be sent for the duration the zone is touched and then to expire when the finger is removed.

Finally, the pointing stick is designed to allow the user to place their hand on it, remove their hand, etc, very easily. Furthermore, the pointing stick will allow the user to control it using a grip similar to that of a "pencil grip", the stick being roughly the thickness of a standard pen or pencil.

It is further an object of this invention to provide a device wherein the pointing component consists of a stick mechanism that allows the user to grip it using the thumb and opposing finger and/or fingers, similar to that of a "pencil grip."

It is further an object of this invention to provide a device wherein the clicking component consists of buttons or zones, preferably touch-sensitive, that allow the user to use them conveniently with the finger and/or fingers, and while keeping the hand in a naturally rested position.

It is further an object of this invention to provide a device wherein the clicking component consists of buttons or zones which allow the user to activate them with a single touch and allows the user to rest the finger and/or fingers on a zone or zones after initial activation: one touch equals one command (i.e., single click, right click, double click, short-cut, etc).

Summary in Reference to Claims

It is therefore a first aspect, advantage, objective and embodiment of the present invention to provide a computer pointing device for use on a work surface by a human user located facing the work surface, the pointing device comprising:
  a first module disposed at a first position corresponding to the natural rest position of such human user's first hand on such work surface;
  a substantially flat second module disposed at a second position corresponding to the natural rest position of such human user's second hand on such work surface;
  the first and second modules being operatively electrically connected to a first computer input port; the first module having a pointing mechanism; and
  the second module having a plurality of touch sensitive devices thereon.

It is a second aspect, advantage, objective and embodiment of the present invention to provide a pointing device wherein the first module further comprises mouse pointing circuitry operative to transmit to the computer standard signals associated with the pointing of a joystick, and wherein the second module further comprises mouse click circuitry operative to transmit to the computer standard signals associated with all of the clicking of a standard mouse.

It is another aspect, advantage, objective and embodiment of the present invention to provide a pointing device wherein the first module comprises a base part and a manipulable part, and wherein pressure applied to the manipulable part generates standard signals associated with the pointing function of a standard mouse, and wherein the base part comprises a generally mouse-shaped housing.

It is yet another aspect, advantage, objective and embodiment of the present invention to provide a pointing device wherein the first computer pointing device input port on such computer further comprises one member selected from the group consisting of: USB port, RS-232, RS-232 variant, large PS/2 mouse port, small PS/2 mouse port, Firewire, IEEE-1394, any other standard computer port now known or later developed, and combinations thereof.

It is yet another aspect, advantage, objective and embodiment of the present invention to provide a pointing device wherein the first module base part further comprises:
  a first scroll wheel.

It is yet another aspect, advantage, objective and embodiment of the present invention to provide a pointing device wherein the second module base part further comprises:
  a first scroll wheel.

It is yet another aspect, advantage, objective and embodiment of the present invention to provide a pointing device wherein the second module further comprises a wrist support.

It is yet another aspect, advantage, objective and embodiment of the present invention to provide a pointing device wherein the second module is less than one half of one inch thick.

It is yet another aspect, advantage, objective and embodiment of the present invention to provide a a computer pointing device for use on a work surface by a human user located facing the work surface, the pointing device comprising:
  a first module having a pointing device, the pointing device having an elongated manipulable part, the elongated manipulable part having a length, the length being sufficient to permit a comfortable grip using thumb and at least one finger.

It is yet another aspect, advantage, objective and embodiment of the present invention to provide a computer pointing device wherein the length is substantially equal to that of a standard pen.

It is yet a further aspect, advantage, objective and embodiment of the present invention to provide a computer pointing device wherein the length is less than two inches.

It is yet another aspect, advantage, objective and embodiment of the present invention to provide a computer pointing device for use on a work surface by a human user located facing the work surface, the pointing device comprising:
  a first module disposed on such work surface;
  a second module disposed on such work surface;
  the first and second modules having an operative connection to each other;
  one module having a computer pointing device thereon while the other module having a first touch sensitive device thereon;
  the second module transmitting to the first module signals relating to click commands, the second module sending standard mouse click commands to the computer.

It is yet another aspect, advantage, objective and embodiment of the present invention to provide a computer pointing device wherein the first module is disposed on such work surface at the natural rest position of a user's hand upon such work surface.

It is yet another aspect, advantage, objective and embodiment of the present invention to provide a computer pointing device wherein the second module is disposed on such work surface at the natural rest position of a user's hand upon such work surface.

It is yet another aspect, advantage, objective and embodiment of the present invention to provide a computer pointing device wherein the operative connections further comprise one member selected from the group consisting of:
  i) a first cable carrying the standard joystick pointing signals from the first module and a second cable carrying the standard mouse click signals from the second module, the first and second cables merging prior to the first computer input port, the combined length of the two cables greater than the length of a standard computer keyboard, ii) a first cable carrying the standard joystick pointing signals and also standard left-click mouse click signals from the first module, a second cable carrying the clicking signals from the second module, the first and second cables merging prior to the first computer input port, the combined length of the two cables greater than the length of a standard computer keyboard, iii) wireless connections, iv) and combinations thereof.

It is yet another aspect, advantage, objective and embodiment of the present invention to provide a computer pointing device wherein the first module also has a touch sensitive device operatively connected to the circuitry of the second module to transmit to the computer standard signals associated with the "left click" of a standard mouse.

It is yet another aspect, advantage, objective and embodiment of the present invention to provide a computer pointing device wherein the first module also has a touch sensitive device operatively connected to left-click circuitry within the first module operatively connected to transmit signals associated with the "left click" of a mouse to such computer.

It is yet another aspect, advantage, objective and embodiment of the present invention to provide a computer pointing device further comprising a third module having joystick pointing circuitry and mouse click circuitry operative to transmit to the computer standard signals associated with the pointing of a joystick and clicking of a mouse.

It is yet another aspect, advantage, objective and embodiment of the present invention to provide a computer pointing device further comprising joystick pointing circuitry and mouse click circuitry operative to transmit to the computer standard signals associated with the pointing of a joystick and clicking of a mouse, the joystick pointing circuitry and mouse click circuitry both located in one member selected from the group consisting of: the first module, the second module.

It is yet another aspect, advantage, objective and embodiment of the present invention to provide a computer pointing device wherein the pointing mechanism of the first module further comprises:

a base unit having an aperture in one surface, the aperture having pointing sensing units disposed therein;

a stylus unit dimensioned and configured to partially enter the aperture, whereby when the stylus is inserted into the aperture and moved, the pointing sensing units sense the motion of the stylus, whereby the stylus, when inserted into the aperture of the base unit, comprises a joystick.

BRIEF DESCRIPTION OF THE DRAWINGS

FIG. 3 is a front elevational view of the modules of a first alternative embodiment of the invention disposed upon either side of a keyboard in the use position.

INDEX TO REFERENCE NUMERALS

Figure 1:
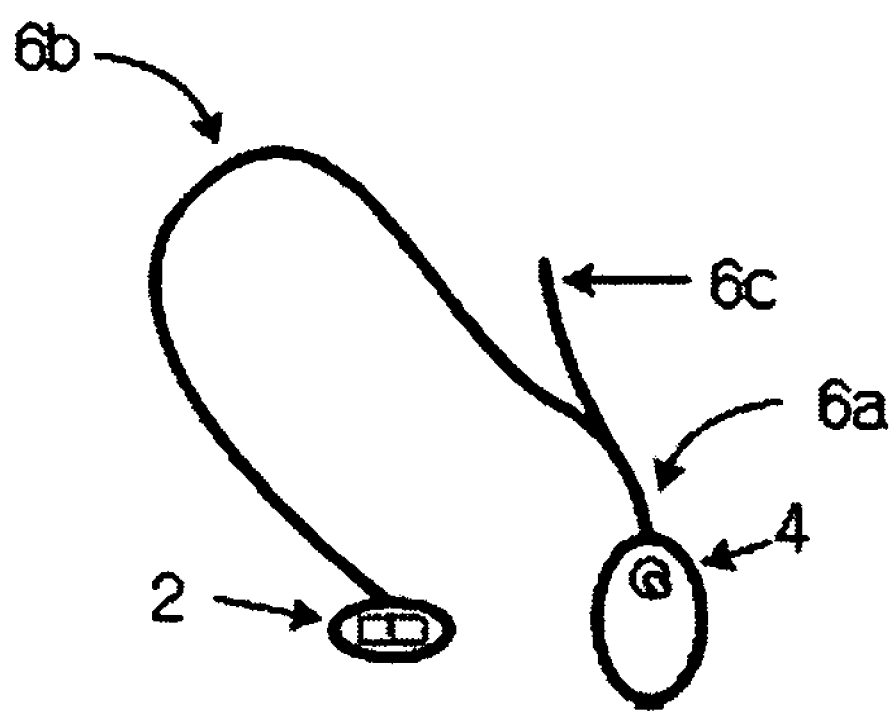
FIG. 1 is a top view of the overall apparatus of the invention, according to a first preferred embodiment of the invention and not shown in the normal use position.

2 Function Pad Module
4 Joystick Module with Programmable Circuitry
6a First Mouse Cable
6b Second Mouse Cable
6c Third Mouse Cable
8 Joystick
10 Joystick Module Bottom
14a First Touch Sensitive Device
16 Scroll Wheel
18 Wrist Support
24 Computer
28 Keyboard
40 Wireless hub
42 Wireless hub cable
52 Comfort Pad
56 Joystick button
100 First cable
102 Second cable 104 First Joystick
106 Second Joystick
202 Adapter plug
204 First cable
206 Cable
208 Second multiple command flow path
210 Mouse
212 Switch device
214 Switch
302 Function pad/Second Module
304 Function pad command flow path
306 Standard mouse output flow path
308 Touch sensitive zone
310 Joystick/First Module
312 Circuitry
400 Computer
402 Click module
404 Pointing module
406 First cable/first command path
408 Second cable/second command path
410 Standard port
412 Third cable/third command path
414 Merging cable/merging command path
416 Circuitry
418 Stylus receiver
420 Stylus/Pen
422 Mouse
424 Switch
426 Function Pad/Module
428 Touch-Sensitive Zone

DETAILED DESCRIPTION

The term "computer pointing device" as used herein refers to such items as joysticks, mice, track balls, touch pads, pressure sensitive pointing devices of any now known or later-developed manner, style, type, specification. The term joystick, however, generally refers to devices having a base portion and a small handle protruding generally vertically therefrom, in which motion of the handle is translated as cursor motion.

Understanding the invention may be understood best by comparison of the invention and the prior art in terms of command flow paths.

Figure 12:
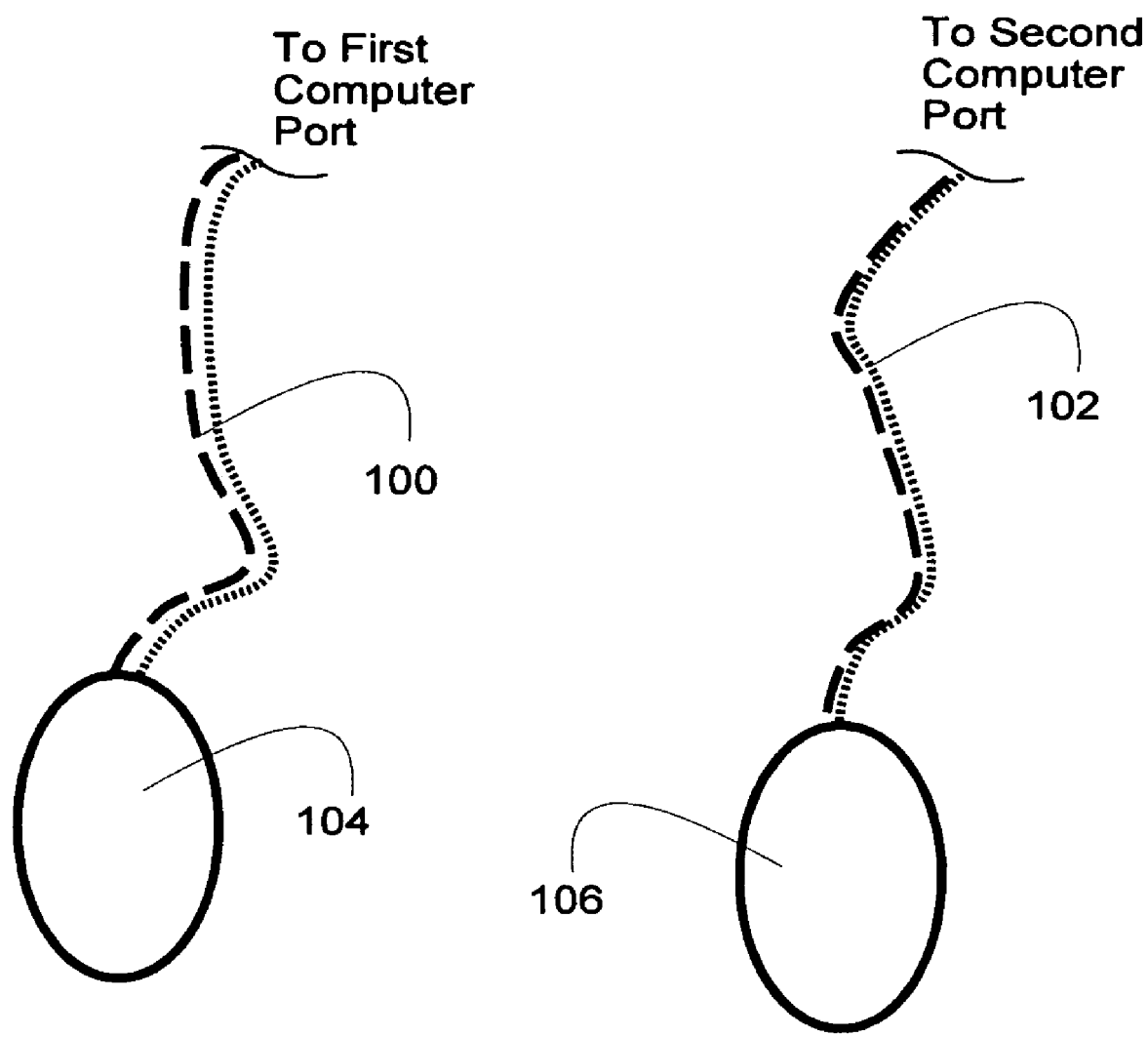
FIG. 12 is a PRIOR ART view of the control path of one type of prior art.

FIG. 12 is a PRIOR ART view of the control path of one type of prior art. First cable 100 and second cable 102 are single cables attached to two different joystick devices 104, 106. Prior art in which two joysticks are used, or two of other types of input devices, may be found easily. Each joystick has an analog input device for cursor motions and a clicking device such as a button, and each occupies a separate one of the ports on the computer. The use of two mice by one user, however, requires that the software of the machine be programmed to accept this arrangement, for example, by a game software module which allow two users to control two different sides in a computer game using two different joysticks. In each command flow path (in this case, cables 100 and 102) multiple signals are sent: both "clicking" commands and "cursor motion" commands.

Figure 13:
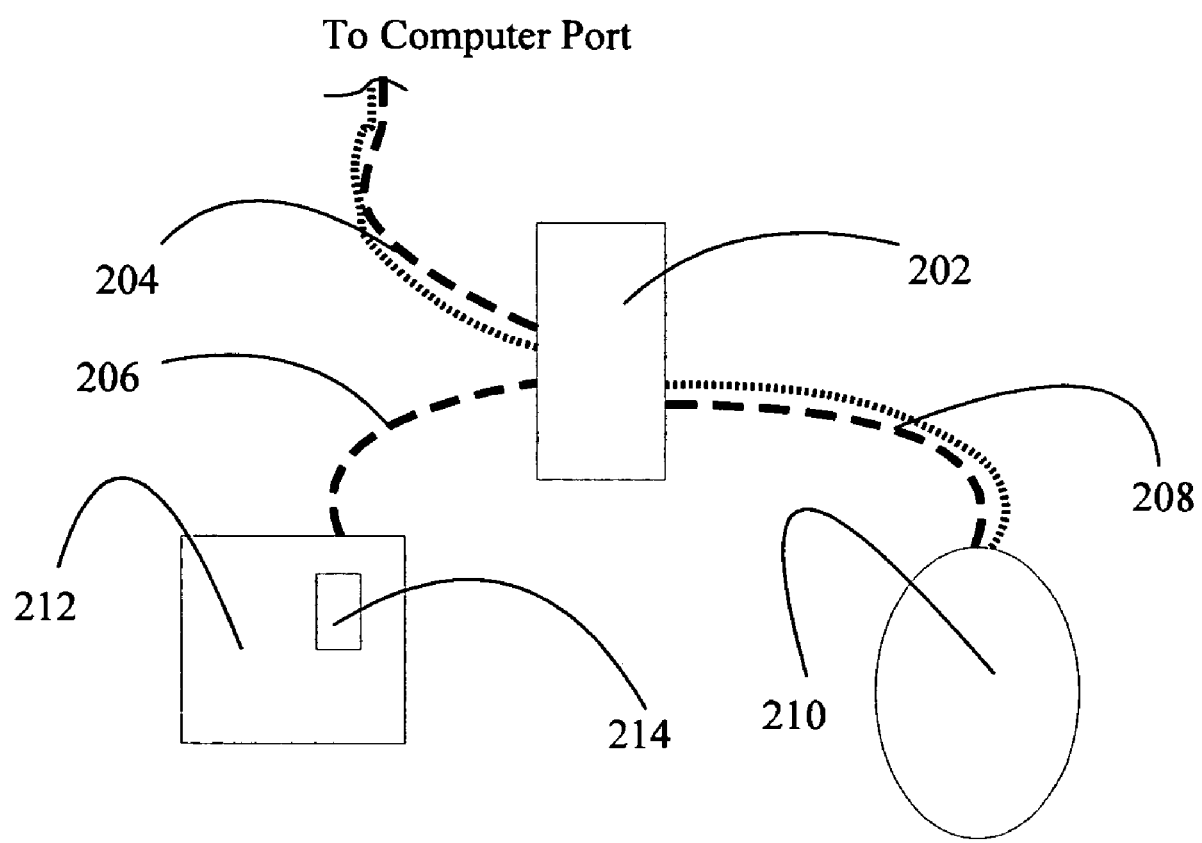
FIG. 13 is a PRIOR ART view of the control path of another type of prior art.

FIG. 13 is a PRIOR ART view of the control path of another type of prior art. Adapter plug 202 acts like it is a standard computer port in accepting a mouse plug therein. The mouse plug comes from mouse 210. First cable 204 actually goes to the computer port. Thus unlike the previously shown prior art, at least only one computer port is needed, a savings of resources. Cable 206 is the cable from the auxiliary switch device 212/214 to the adapter plug 202.

Second multiple command flow path 208, on the other hand, is merely the standard mouse cable of the mouse, plugged into adapter plug 202. Thus this prior art is a two part device: a standard mouse and an auxiliary switch device 212, having thereon an actual switch 214.

However, since there is no circuitry controlling the access to the computer of the various commands, certain results may occur which are undesirable. Individuals with access issues may find themselves hitting the standard mouse's button by accident, thus generating bogus clicks or turning a single click into a double click, etc.

Figure 20:
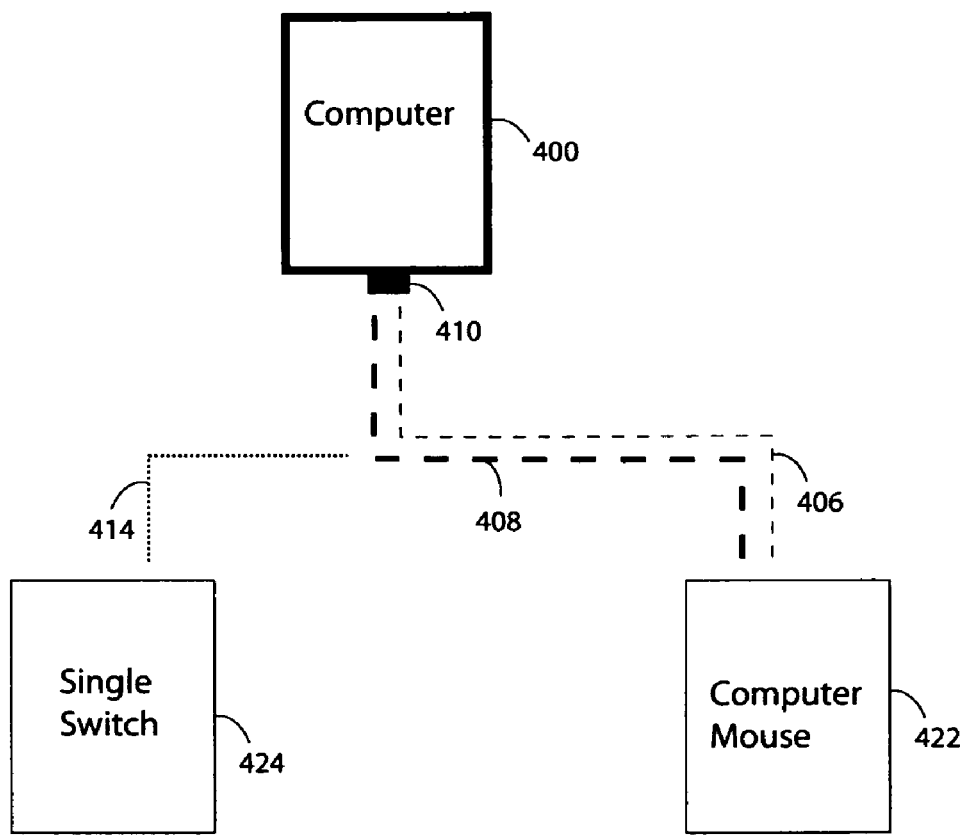
FIG. 20 is a block diagram of a PRIOR ART configuration.

FIG. 20 is a block diagram of a PRIOR ART configuration. In the prior art known, two configurations of control paths are possible. A standard computer mouse 422 may have a cable 406, 408 carrying both clicking and pointing information to the computer 400 via port 410. A single switch 424 may connect via "adapter" 414 to the cable. In the other configuration, it may be possible that the same physical arrangement simply shorts out the mouse circuitry at the "adapter" in order to transmit a click command from switch 424.

Figure 11:
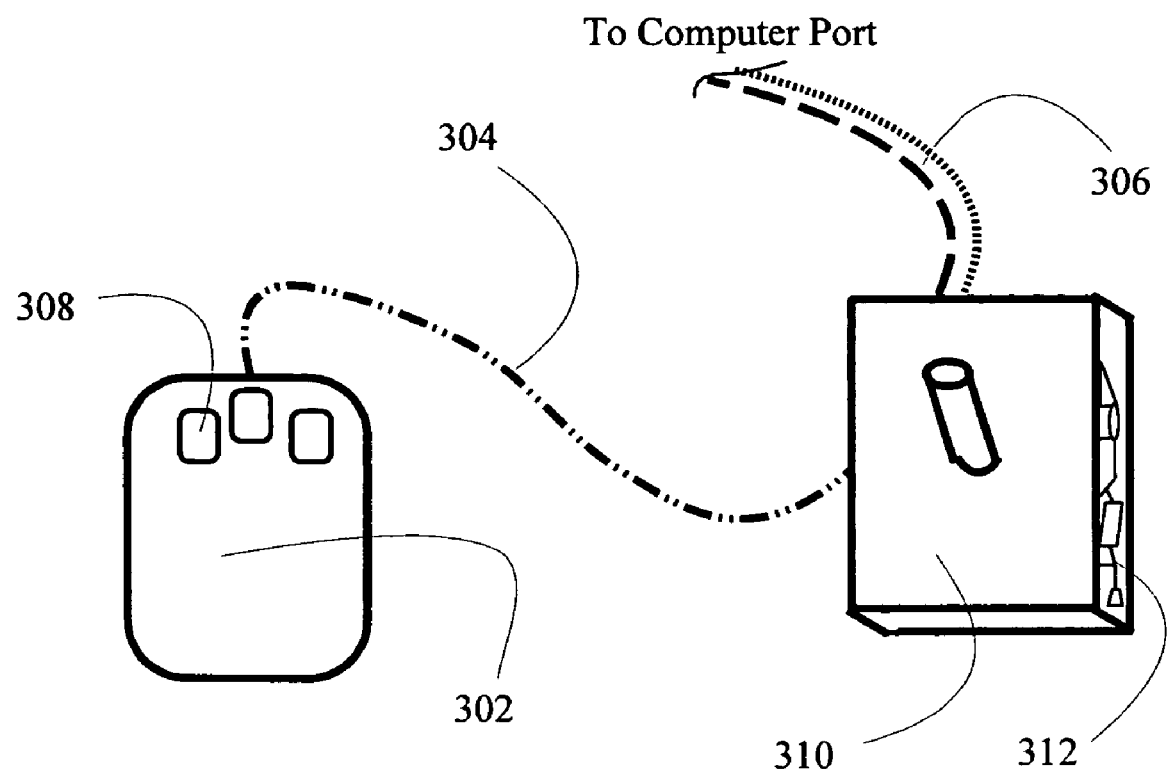
FIG. 11 is a functional view of the control path of the invention.

FIG. 11 is a functional view of the control path of the invention. First module 310 has a joystick thereon, and it sends two types of commands to the computer via a single port: normal mouse motion commands generated by the input device on the first module itself, and mouse commands involving clicking. These are represented by two types of dotted lines to the computer in command/control flow path 306. In a wired embodiment, these command/control flow paths correspond to cables such as mouse cables, joystick cables, etc. In a wireless embodiment, the cables are absent but the command flow paths are present via wireless connections such as BLUETOOTH mating of two devices, dedicated IR or radio links, etc. The user's intent in terms of clicking is determined by reference to the second module, the function pad 302, having touch sensitive zone 308, which may be thought of as a button, though it may equally be a skin capacitance detector, a membrane, switch, etc. Command flow path 304 sends information on the use of the touch sensitive device 308 and others on the function pad. First module 310, in circuitry 312, then translates these commands into standard mouse commands which it sends to the computer as previously discussed on command flow path 306. In embodiments, the commands sent by second module 302 may be standard mouse commands, in which relay of the commands may be all that is necessary.

Figure 14:
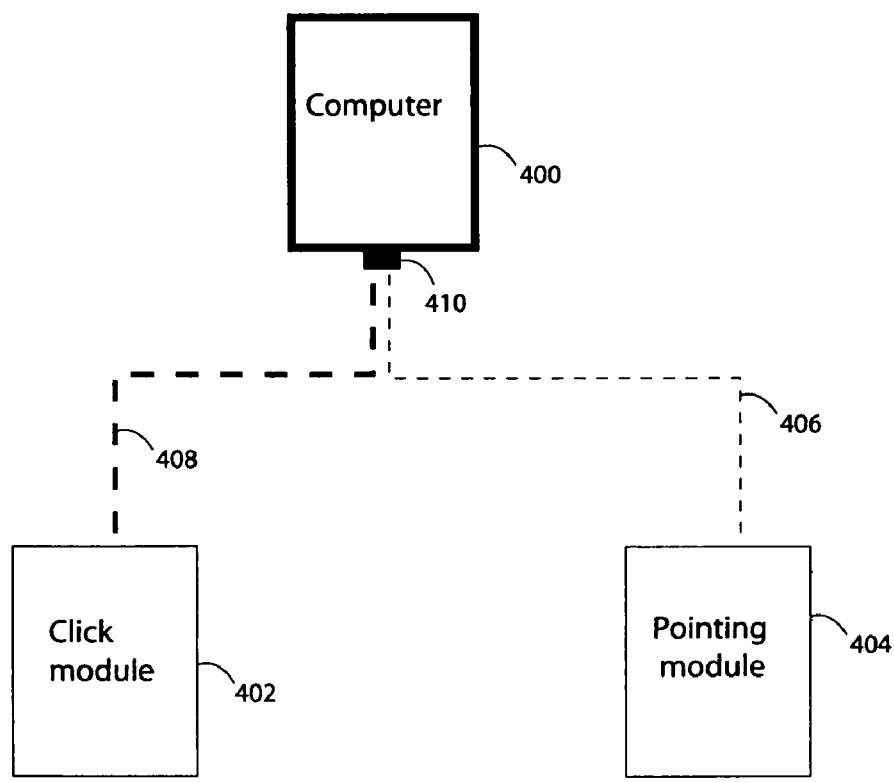
FIG. 14 shows an alternate type of control path of the invention with pointing circuitry being contained within the first module and click command circuitry in the second module.

FIG. 14 shows an alternate type of control path of the invention: a first cable 406 from the first module 402 carrying all click and scroll signals to the computer; and a second cable 408 from the second module 404 carrying all pointing signals to the computer; the two cables or control paths 406, 408 merging into one physical cable having two control paths therein, the one cable then plugging into one physical computer port 410. By this means, the two modules may be placed at a distance apart. For reasons of convenience, the distance of separation may be at least the length of a standard computer keyboard.

Note that the designation of first and second modules and cables/command paths is somewhat arbitrary: in embodiments either of the pointing module or the clicking module may be considered to be the first module or the second module.

Figure 15:
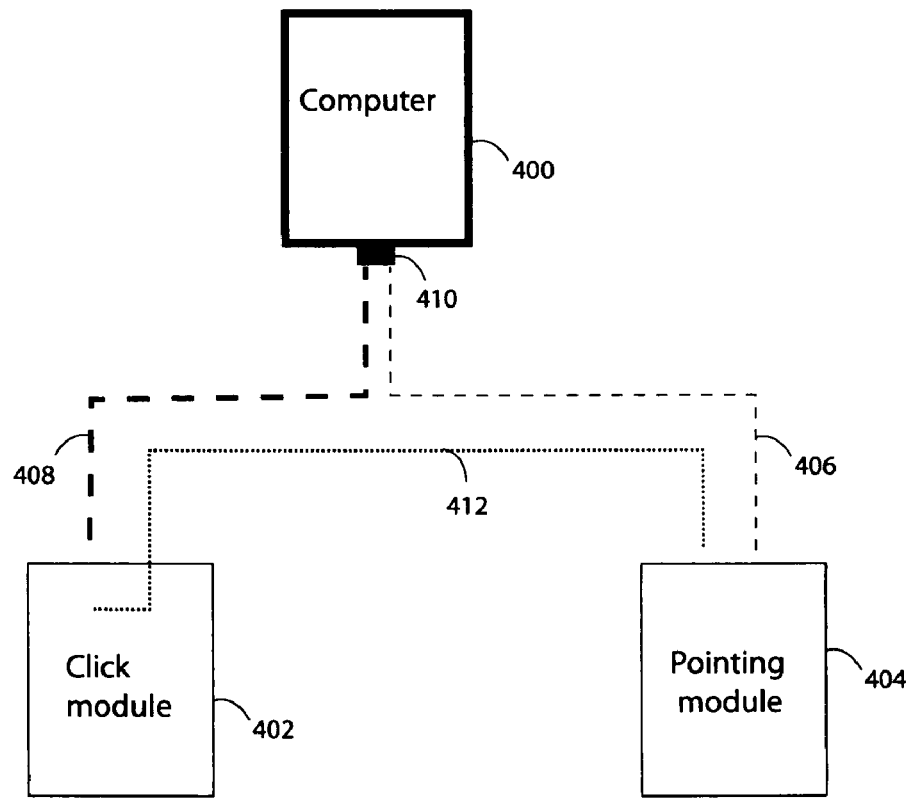
FIG. 15 shows an alternate type of control path of the invention with pointing circuitry being contained within the first module along with an optional physical button connected to second module's circuitry and all of the click command circuitry in second module.

FIG. 15 shows an alternate embodiment of the control path of the invention: a cable 406 from the first module 402 carrying all click and scroll commands that merges with a second cable 408 carrying all pointing signals from the second module 404 before plugging into one computer input port (USB, PS/2, RS-232c, etc) the two cables together reaching at least a distance equaling the length of a standard computer keyboard before they merge. In this embodiment, a physical button in the first module 402 connects to click command circuitry in the second module 404.

Figure 16:
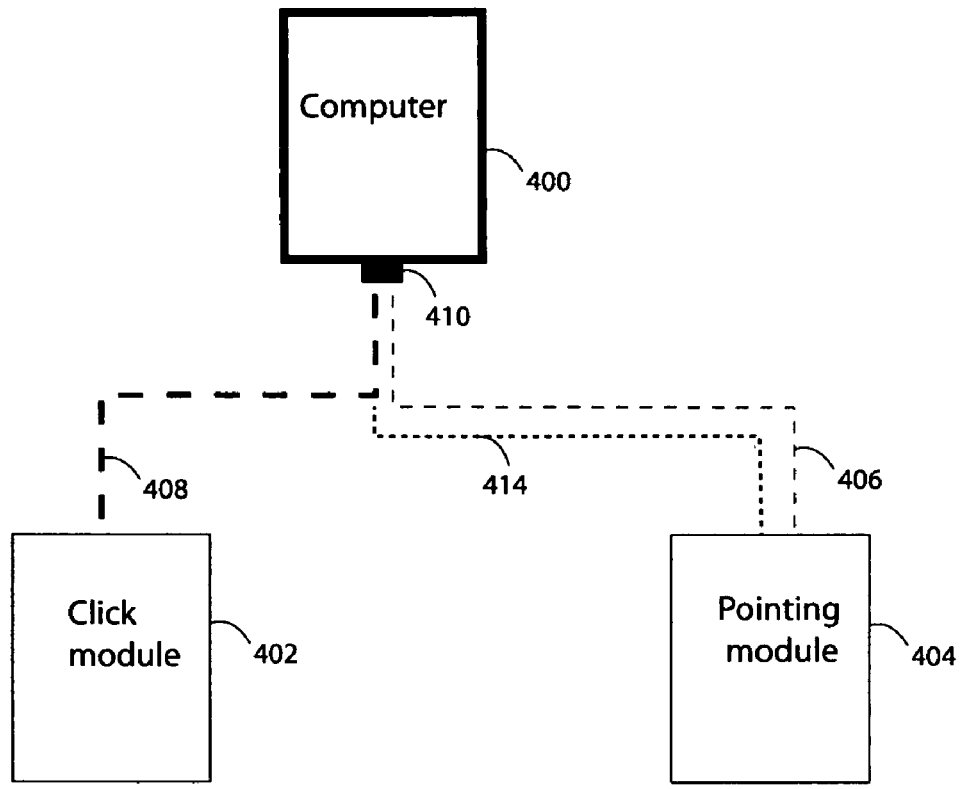
FIG. 16 shows an alternate type of control path of the invention with pointing circuitry and a physical button and circuitry for left click command only being contained within the first module and all click command circuitry in the second module.

FIG. 16 shows another alternate embodiment of the control path of the invention: a cable 406 carrying pointing and left click commands from the pointing module 404 merging with a cable 408 carrying all click and scroll commands from the second module 402; all click command circuitry being contained in the second module 402 with pointing command and left click command circuitry in the first module 404.

Figure 17:
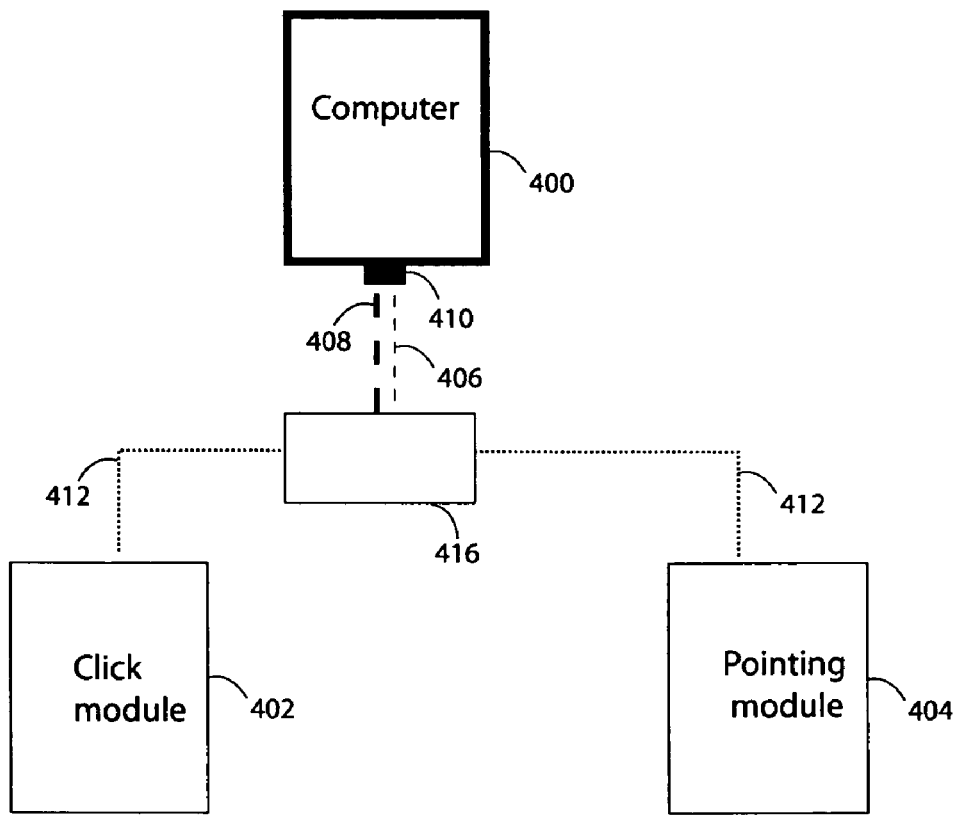
FIG. 17 shows an alternate type of control path of the invention with all pointing circuitry and click command circuitry contained between computer and modules.

FIG. 17 shows another alternative embodiment of the control path of the invention: two cables 412 carrying signals from the physical devices contained in each module 402, 404 to the circuitry for pointing and all click commands 416; commands are then sent from that circuitry to computer.

Figure 18:
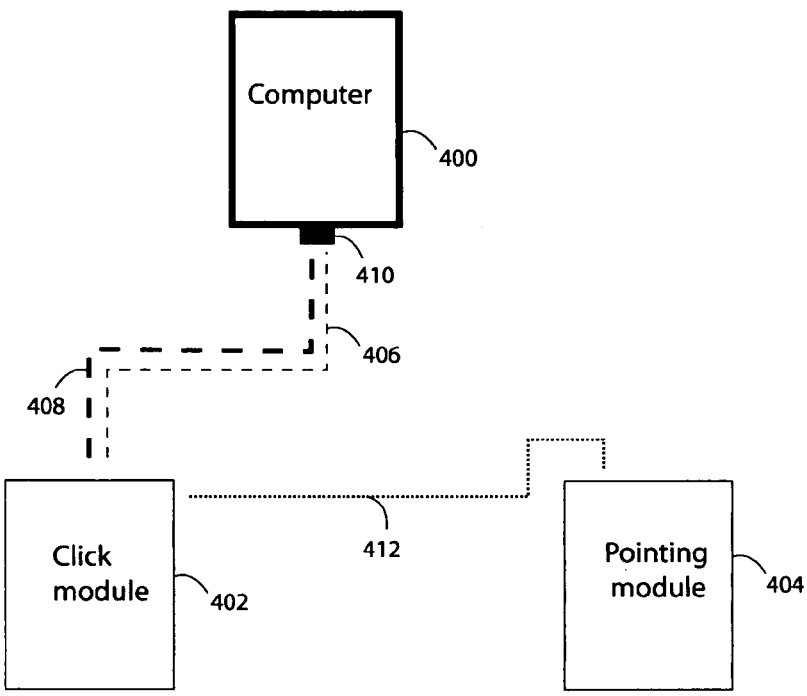
FIG. 18 shows an alternate type of control path of the invention with all pointing circuitry and click command circuitry contained in the second module and a pointing stick device contained in first module with no circuitry.

FIG. 18 shows an alternate embodiment of the control path of the invention: all pointing and click/scroll command circuitry is contained within one module (click module 402), with a cable 412 carrying signals from the pointing device in the second module 404 that connects to the circuitry in the first module 402. A double control path 406, 408 may then actually connect to port 410 and thence to computer 400.

Figure 19:
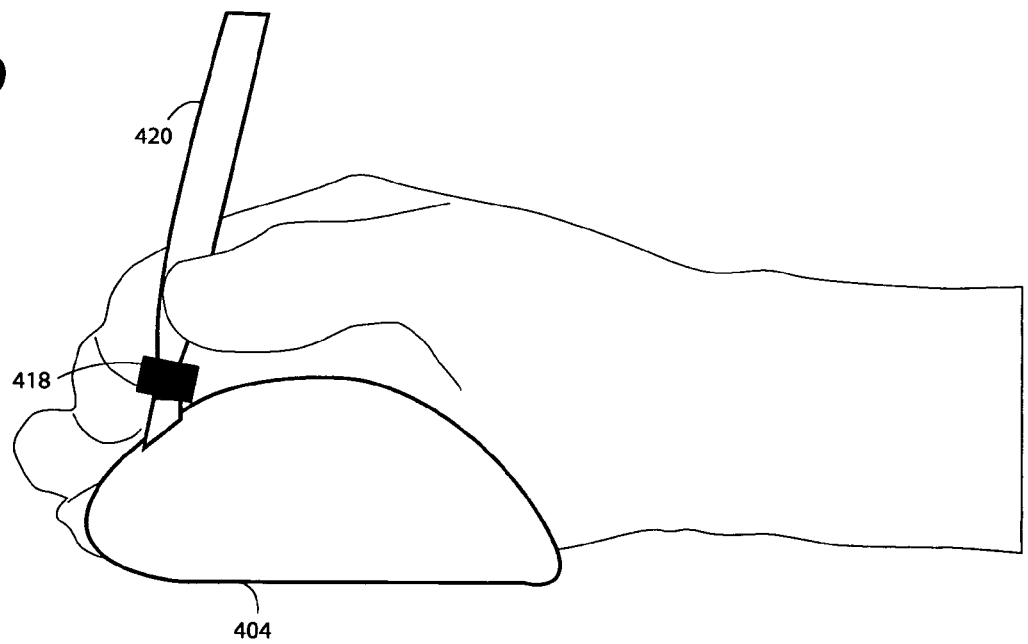
FIG. 19 is a side view of a modified stick to accept pen device.

FIG. 19 shows an alternate type of stick device: a modified version of the stick that allows a pen type device to insert into the stick and to be used as the pointing stick.

The term stylus as used herein includes not just pen shaped devices having no writing structures but also pens having pen tips, balls, ink supplies and so on. Stylus 420 may have a point inserted into stylus receiver 418, which may be a cuff, a cylinder, a body having a small recess or cavity on the top, a magnet, or just a depression on the top of the module 404 having sensors within the depression, etc, so long as stylus receiver 418 is configured and dimensioned to accept such stylus tip. Broadly, stylus receiver 418 is termed to be an "aperture" in this application. Thereafter, motions of stylus 420 may be transmitted to pointing module 404 by means of the stylus receiver 418.

FIG. 1 is a top view of the overall apparatus of the invention, according to a first embodiment of the invention and not shown in the normal use position. In this presently preferred embodiment and best mode presently contemplated for carrying out the invention, function pad module 2 connects to joystick module 4 via first standard mouse cable 6a and second standard mouse cable 6b. Third mouse cable 6c connects the invention to a computer's pointing device input port. In a wired embodiment such as this one, the cables correspond to the command flow paths. Such computer may be any type of computer on the market, regardless of type, operating system, power, processor or other qualities, so long as it uses such input devices as a computer mouse, a joystick, a touch pad, an embedded pointing device in the keyboard, etc. The first computer pointing device input port on such computer further comprises one member selected from the group consisting of: USB port, RS-232, RS-232 variant, large PS/2 mouse port, small PS/2 mouse port, Firewire, IEEE-1394, and other direct or indirect connections, connectors or ports of any now known or later-developed manner, style, type, specification.

The cable or cables connecting the two modules of the device may have a combined or individual length greater than the length of a standard computer keyboard, whether a PS/2 keyboard, 104 key keyboard, USB keyboard, etc. In general, this length will be in the range of 24 inches (approx 61 cm.) in order allow the two devices to be comfortably placed on either side of such a keyboard, with enough extra cable to allow a loose routing of the cable therebetween. As an alternative, a cordless connection could be used between the components and/or the computer, wireless alternative embodiments are discussed below.

The modules are placed at two or more positions near the keyboard, as shown in FIGS. 2 through 5 in reference to various embodiments. The presently contemplated best mode of use of the invention is as follows. The first position is adjacent to a first end of a computer keyboard, and the second use position is adjacent to a second end of the computer keyboard, with the first module 4 disposed at the first position and the second module 2 disposed at a second position. These are referred to as the natural rest positions of a human user's hands. The first use position corresponds to the natural rest position of such human user's first hand on such work surface and the second use position corresponds to the natural rest position of such human user's second hand on such work surface. Obviously, the user may adjust the exact placement of the device in and at these general positions.

It is another important aspect of the present invention to simply provide greater accessibility based upon this natural rest position. The natural rest position for any two people will be different, but for those of differing enablements or differing work needs, the changes may be quite large. For example, a user with a largely incapacitated hand able to rest only in certain places may advantageously place the function pad under that hand, and use that hand only for "click" operations. Individuals in need of a high volume of high precision cursor location "clicking" (such as graphic artists and designers) may place the joystick (first module 2) in a central location, displacing the keyboard to one side or the other. Other arrangements are possible, especially as those functions needed frequently may be programmed into the circuitry 312 for any input from any touch sensitive zone, thus further decreasing reliance upon undesired hardware such as a keyboard or mouse, depending upon each user's preferences and needs.

The modules 2 and 4 combine to act as a standard mouse or joystick. The first module 4 transmits to the computer standard signals associated with the pointing function of a standard mouse, while the second module 2 transmits to the computer via the first module standard signals associated with the clicking functions of a standard mouse. In alternative embodiments having a scroll wheel, the scrolling functions of the mouse are generated in the pad module 2. Note that the actual transmission of click commands to the computer occurs at first module 4 in those embodiments in which interpretation of the commands from second module 2 is used, though in certain embodiments, the circuitry for this may be omitted or simplified and first module 4 may merely retransmit or pass through such commands.

Standard and well known cursor control software may be used to customize cursor acceleration, speed, blink rate, automate clicking functions, allow for Mouse Gesture programming and so on. Such software is not altered in any way by the use of the present device: the computer "sees" a standard mouse. The programming in the device itself, on the other hand, allows a wide variety of user choices of inputs to be used to generate different ones of the standard commands the computer actually receives.

Figure 2:
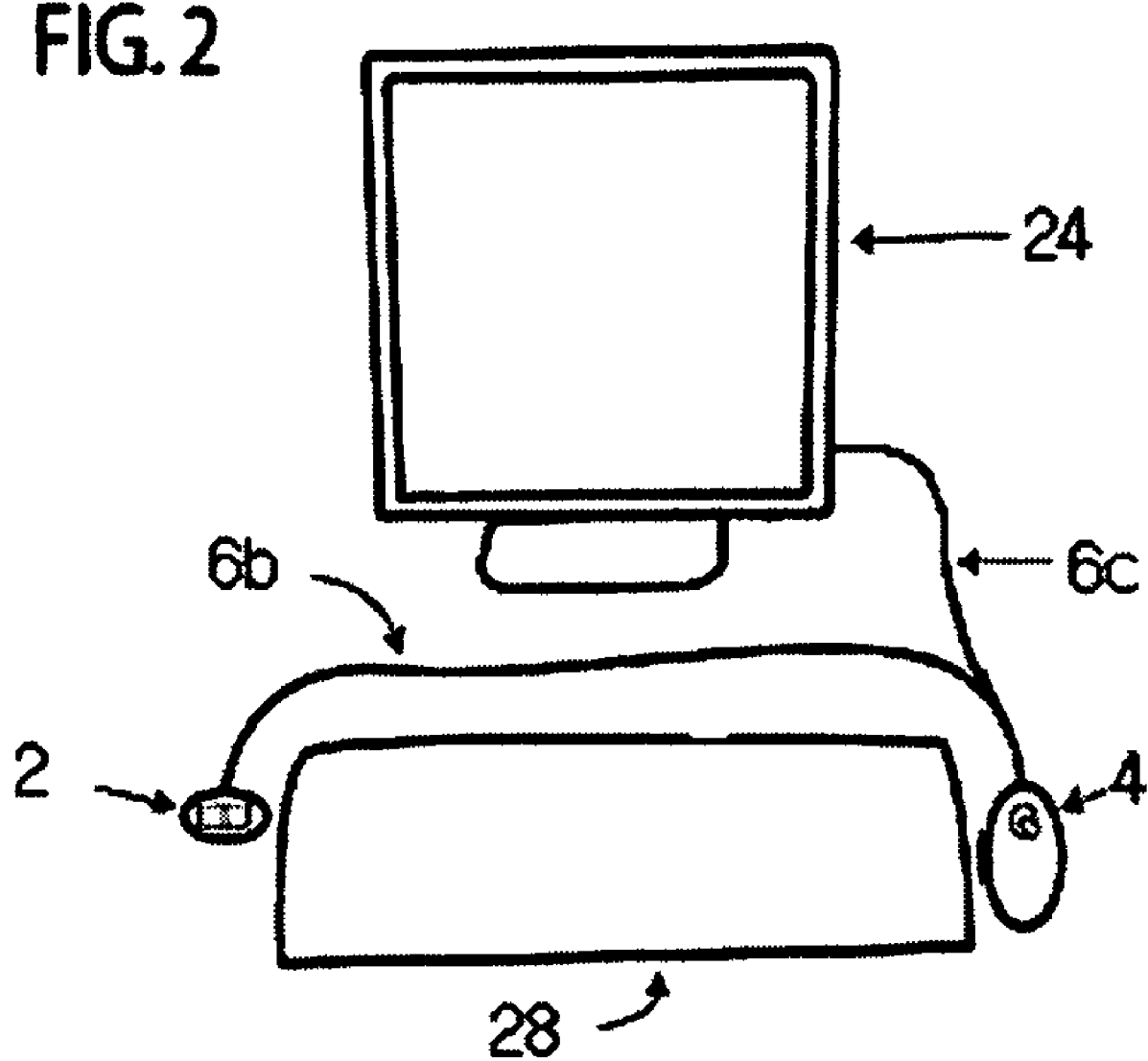
FIG. 2 is a front elevational view of the modules of the preferred embodiment of the invention disposed upon either side of a keyboard in the use position.

FIG. 2 is a front elevational view of the modules of the preferred embodiment of the invention disposed upon either side of a keyboard in the use position. Second cable 6b is long enough to connect joystick module 4 and second module 2, while first and third cables 6a and 6c connect the modules directly to the computer. Both modules are shown disposed at ends of the keyboard.

It will be noticed that second module 2 is advantageously very thin, or substantially flat. In the best mode now contemplated for carrying out the invention, second module 2, the function pad, is approximately ¼ inch (6.35 mm) thick, and more generally is no more than ½ inch (12.7 mm) thick. In pursuit of this goal, the touch sensitive zones thereon may advantageously be membrane type buttons, thin buttons, skin capacitance detectors, touch sensitive devices such as are used for laptop computer touch pads, and the like. In another embodiment, the second module 2 is simply flat and even thinner than the thicknesses discussed above: thicknesses of 1/16 inch (1.59 mm) or less are commercially achievable. All fall within the definition of "substantially flat" as used herein.

To repeat one advantage of the invention, in alternative usage embodiments of the invention, the two modules may be placed at ANY convenient location within reach of the cables, and for this reason it is desirable that the various cables of the invention be of at least a reasonable length such as 24 inches each. In alternative embodiments, the cables may be much longer than that. For some users having usage or access issues, reversing the placement shown may be necessary, while for others placing one or both modules at dramatically different locations may be beneficial, as noted previously.

FIG. 3 is a front elevational view of the modules of a first alternative embodiment of the invention disposed upon either side of a keyboard in the use position. This is a wireless embodiment in which second module 2' and first module 4' are connected by wireless signals to wireless hub 40 having cable 42 and thence to computer 24'. Keyboard 28' may also be wireless in design. The usage and construction of such devices is known: they may be RF, RF with BLUETOOTH or similar protocols, IR and combinations thereof. Circuitry 312 (FIG. 11) may additionally provide support for these functions.

Figure 4:
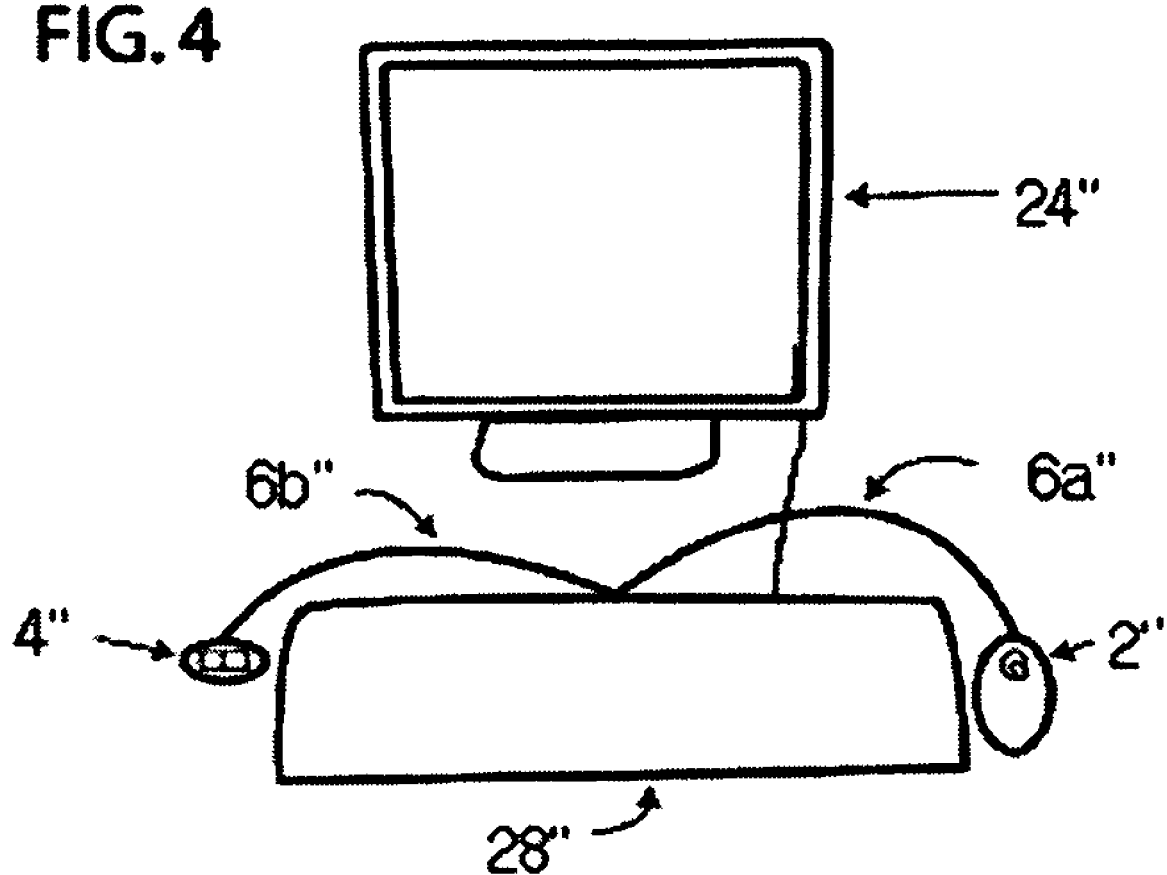
FIG. 4 is a front elevational view of the modules of a second alternative embodiment of the invention disposed upon either side of a keyboard in the use position.
Figure 5:
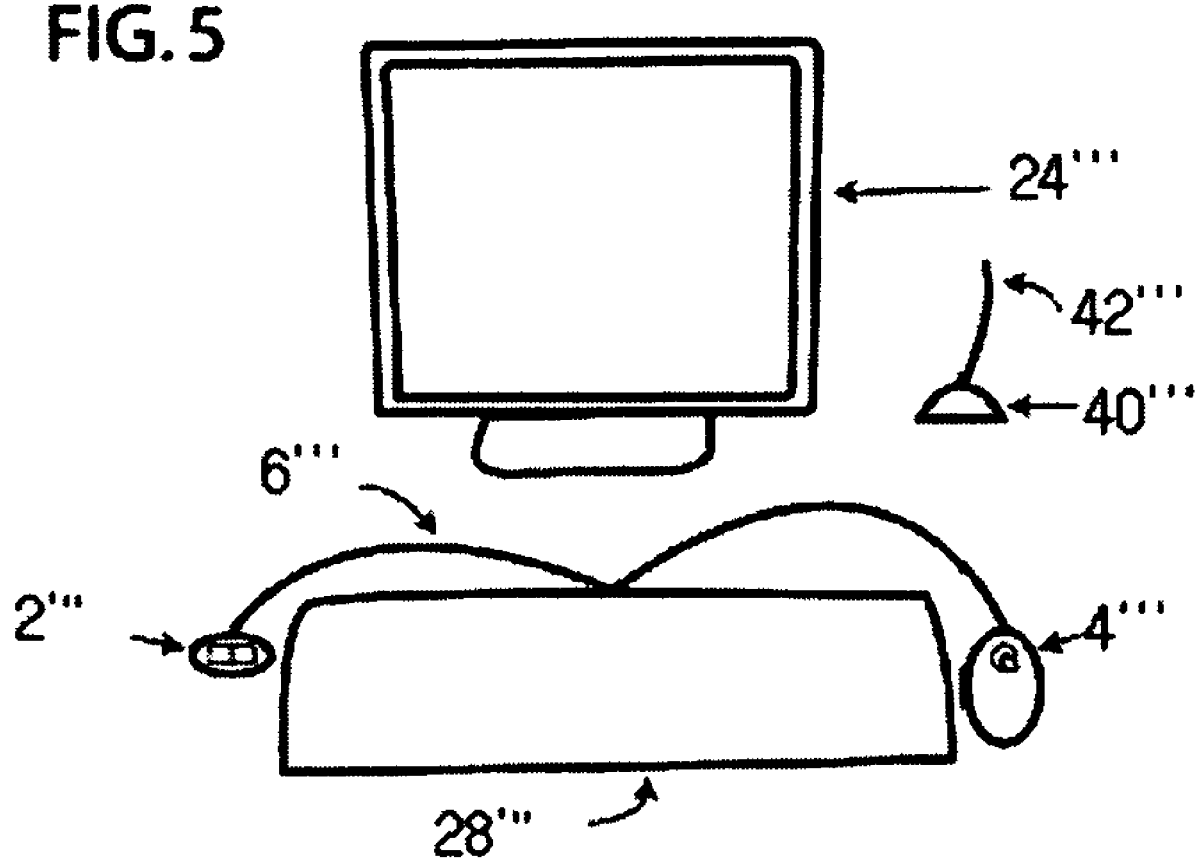
FIG. 5 is a front elevational view of the modules of a third alternative embodiment of the invention disposed upon either side of a keyboard in the use position.

FIG. 4 is a front elevational view of the modules of a second alternative embodiment of the invention disposed upon either side of a keyboard in the use position. In this embodiment, modules 2" and 4" connect to keyboard 28" and thence to the computer, thus eliminating cable 6c. FIG. 5 is a front elevational view of the modules of a third alternative embodiment of the invention disposed upon either side of a keyboard in the use position. This combinational embodiment relies upon a wireless keyboard 28''' to connect to wireless hub/cable 40'''/42''' and thence to computer 24''', but without requiring wireless capabilities of modules 2''' and 4''': these modules may connect via cable 6''' to the keyboard 28'''.

Figure 6:
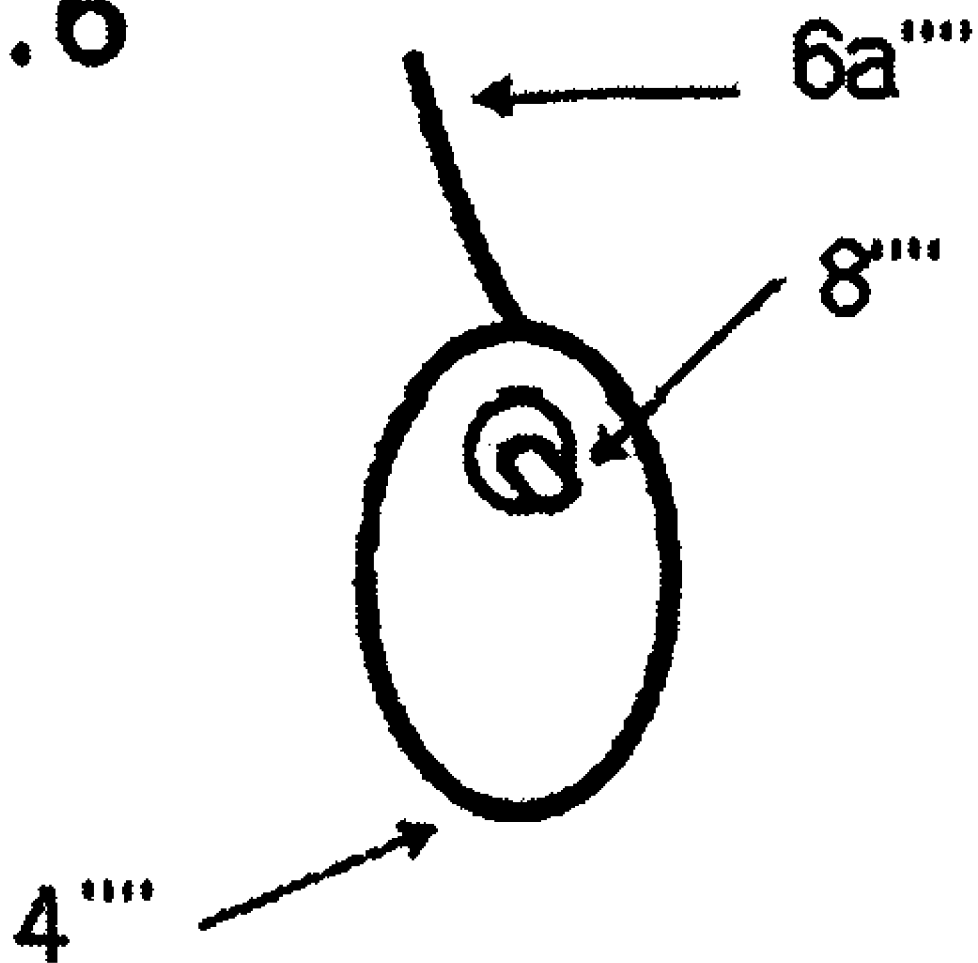
FIG. 6 top view of the joystick module of the fourth alternative embodiment.
Figure 7:
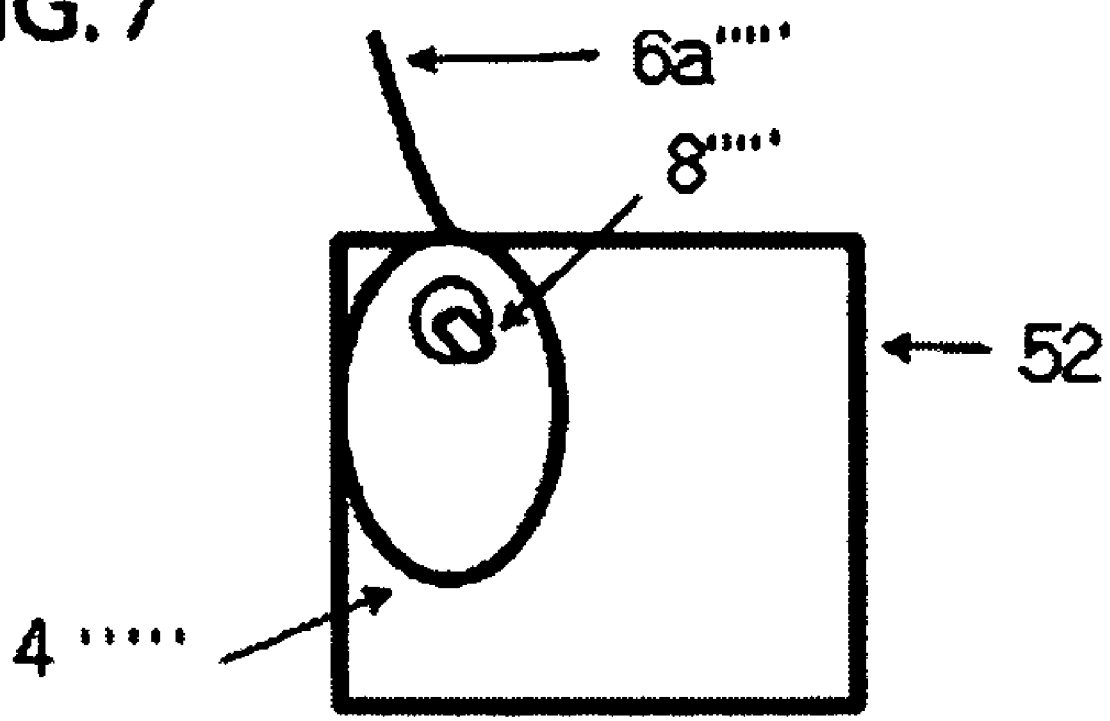
FIG. 7 top view of the joystick module of the fifth alternative embodiment.
Figure 10:
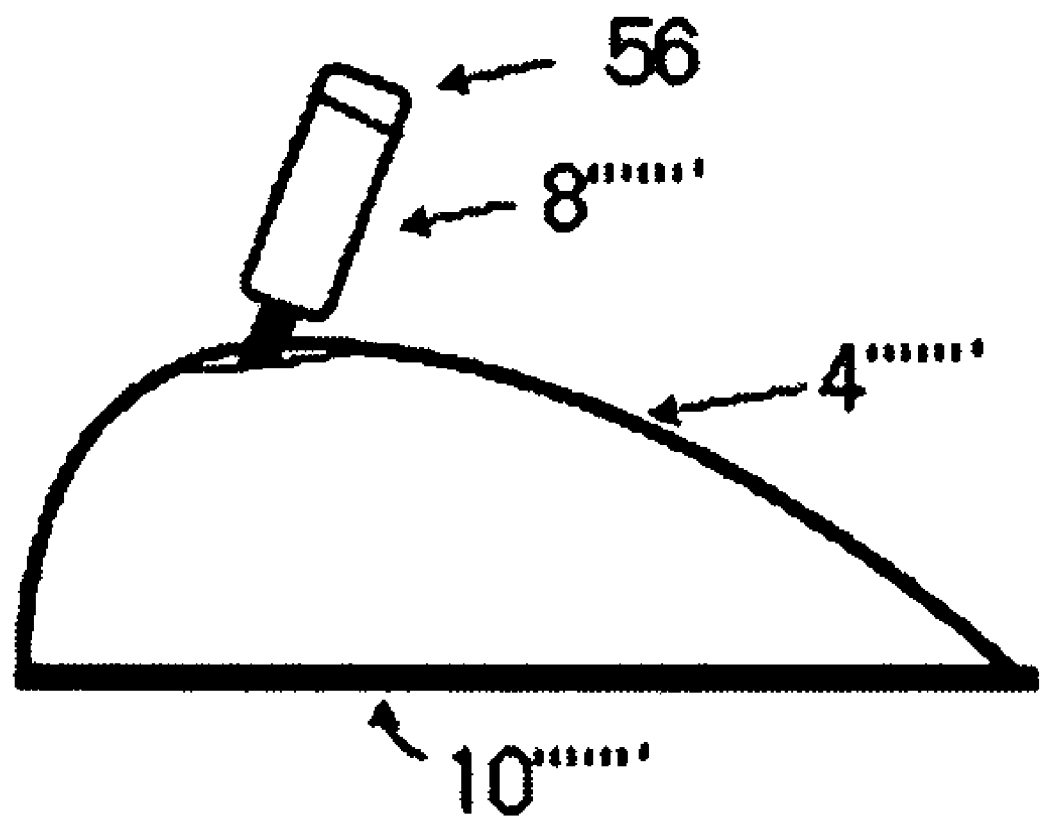
FIG. 10 is a side view of the joystick module of the seventh alternative embodiment of the invention.

FIG. 6 is a top view of the joystick module of the fourth alternative embodiment. FIG. 7 top view of the joystick module of the fifth alternative embodiment. FIG. 10 is a side view of the joystick module of the seventh alternative embodiment of the invention. The difference is that an optional button used in the seventh alternative embodiment may be positioned upon the joystick (8'''''). ("Prime" marks (8'''') indicating the numeration of the appropriate alternative embodiment for repeated components. In general terms a component "8" may refer to that same component with or without changes, regardless of which embodiment is referred to. Specific differences are pointed out by textual reference to the appropriate reference numeral with prime marks. Different numerals may also indicate different embodiments of similar parts.)

The embodiment of FIG. 6 shows that the joystick may function as a large button, so when grasped like a pencil and pushed down, the entire joystick provides the button action. The pencil grasp of the device is desired for other reasons, as discussed below.

The embodiment of FIG. 7 shows a comfort pad 52 which may support the wrist of the user in a manner analogous to the wrist support 18 used with the click function module 2. This cooperation with the thinness of the invention is desirable for additional wrist support, dependent upon the needs or preferences of the users.

Generally for all embodiments, joystick module 4 generally comprises joystick 8 and joystick module bottom 10. Contained within either module or divided between both may be circuitry which may carry out normal functions in accepting pressure applied to the manipulable part and generating therefrom either specialized or proprietary or standard signals associated with computer cursor pointing functions, computer graphics functions, game play functions and so on, that is, it functions in a manner identical to the pointing functions of a standard mouse or joystick, regardless of details of the internal mechanisms used to generate such signals (i.e. the difference between pressure sensing, switch sensors, optical sensors and so on is not claimed herein). The same circuitry may also be employed as part of circuitry 312.

The first module 4 comprises a base part 10 and a manipulable part 8, and in the best mode presently contemplated, the base part comprises a generally mouse-shaped housing. The advantages of a mouse shaped housing include ease of recognition by users, convenient and ergonomic size and shape, an absence of sharp edges and others. There may be a bottom having a soft rubber manufacture, or small feet, or other devices to assist in maintaining placement of the device in the desired position. The joystick device may be grasped like a pen or pencil and an optional click command can be sent by depressing the joystick itself or by means of a button somewhere on the component, an example being the top of the joystick as shown in FIG. 10.

Use of the "pen grip" or "pencil grip" is another feature of the present invention. Traditional joysticks normally use a full five fingered grip which may present access issues to some users. The present invention teaches a very short joystick which allows a pen grasp on the manipulable part and thus minimizes full hand motions in favor of smaller finger motions on the part of the thumb and index finger.

In the presently preferred embodiment, the manipulable part (joystick) may be less than two inches long, even in embodiments less than one inch long. In general, the length of the manipulable part may be described by the following structural formulation: the length of the joystick may be less than that length needed to grip the manipulable part with a five fingered grip. This reduction allows the user to more easily access the device when they move their hand to the device and away from the device: a short vertical lift may entirely clear the hand from the device, in contract to the horizontal uncurling of the hand from a larger joystick, followed by a horizontal swing away.

However, in other embodiments, the manipulable part may be approximately the length of a standard pen or pencil, normally approximately 12 to 20 centimeters (roughly 5 to 8 inches).

The length should be substantially equal to that length necessary to grip the manipulable part with a pencil grip between index finger and thumb, a short measure which may easily be less than one inch.

Figure 8:
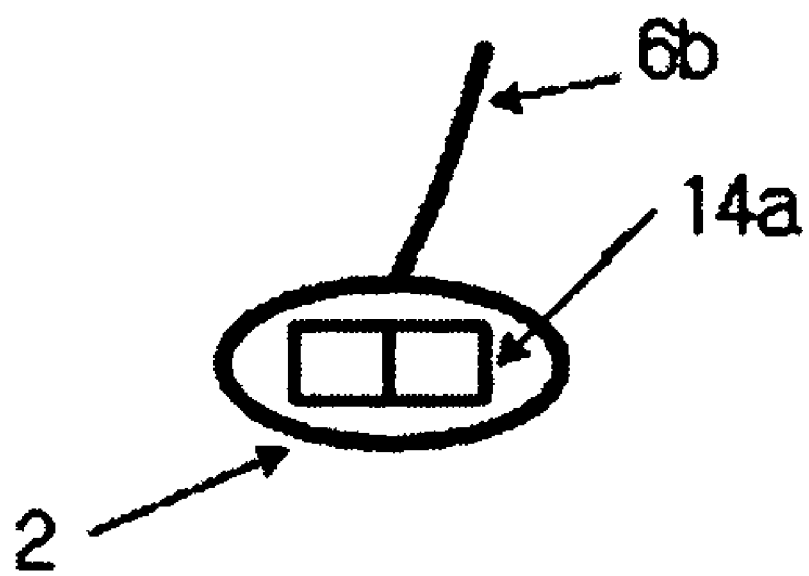
FIG. 8 is a top view of the function pad module of the invention.
Figure 9:
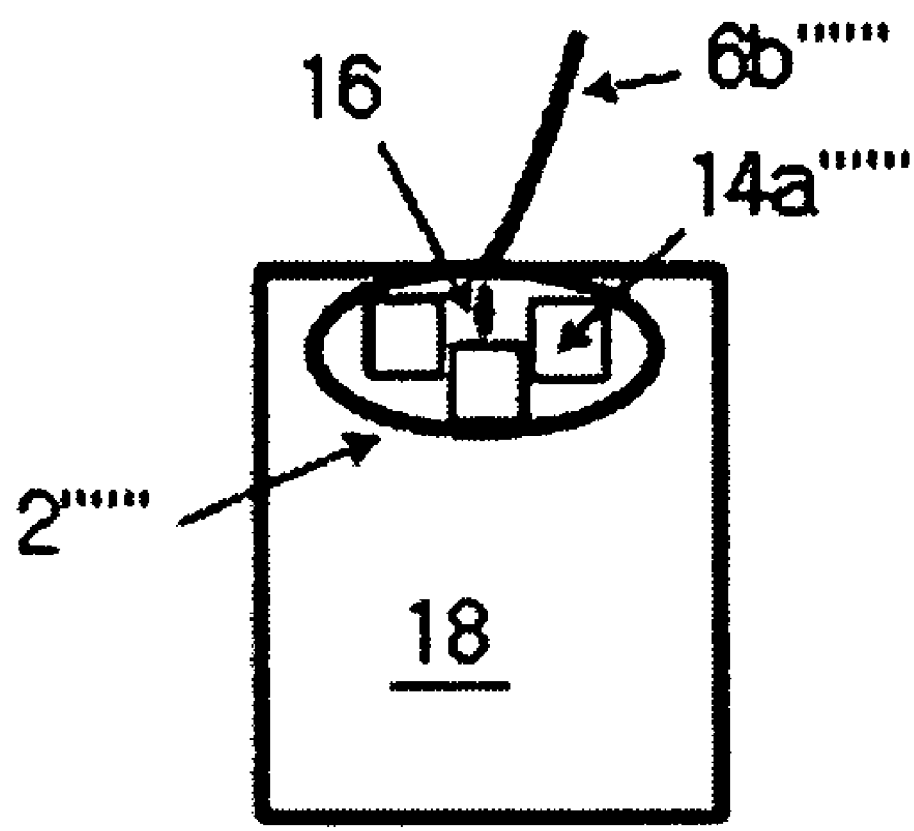
FIG. 9 is a top view of the function pad module of the invention according to a sixth alternative embodiment.
Figure 21:
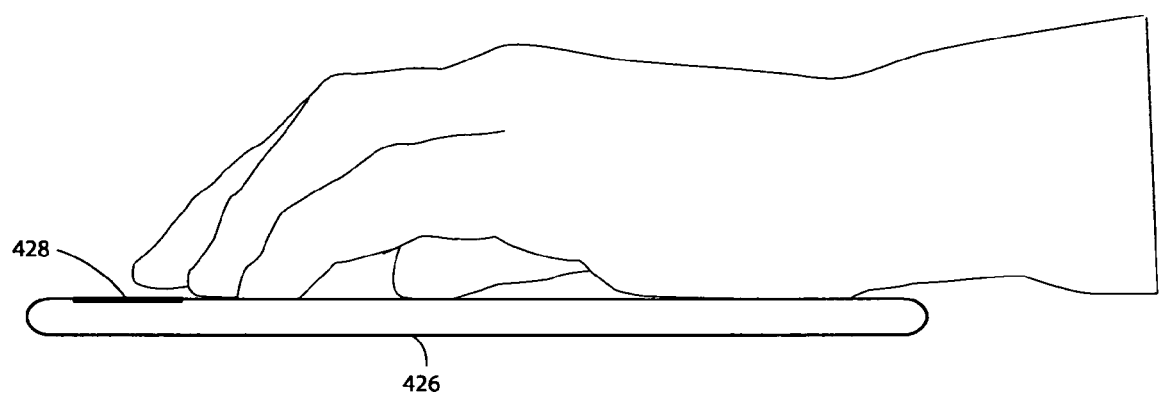
FIG. 21 is a side view of a module of the present invention.

FIG. 8 is a top view of the function pad module of the invention according to the preferred embodiment and best mode now contemplated while FIG. 9 is a top view of the function pad module of the invention according to a sixth alternative embodiment, and FIG. 21 is a side view of a module of the present invention. First, second, third and fourth touch sensitive devices such as first touch sensitive device 14a may conveniently be visualized as buttons and are in alternative embodiments, however, in the presently preferred embodiments these are not actual physical switches but rather touch sensitive devices such as body capacitance sensors or the like. Function pad 426 may be exceedingly thin in depth, as seen in FIG. 22, and touch-sensitive zone 428 may be built therein to render it the same depth as the remainder of the function pad.

Wrist support 18 (FIG. 7, but to a lesser degree FIGS. 8, 9, 22) may provide more ergonomic benefit by supporting the user's wrist and hand in the proper orientation on pad module 2''''. Standard scroll wheel 16 is presently placed in the sixth alternative embodiment depicted herein on function pad module 2''''. However, in alternative preferred embodiments, it may be located on the first module 4 (the joystick module). Scroll wheels have become an increasingly common feature of modern computer mice and provide another ergonomic benefit thereto. A normal scroll wheel allows vertical motion of a "scroll bar" type device in the vertical plane of the computer display, or may provide game functionality, graphical functionality and so on, normally in the vertical plane. However, while scroll wheels are often used for scrolling a graphical display, they are also quite frequently used to scroll down a list and may also have "click" generation functionality built into the wheel itself, and thus partake of both pointing and clicking. At the present stage of testing, it has been determined that placement on the second module (the function pad module 2) is simply easier to learn and use.

Touching or pushing any of the touch sensitive areas generates standard mouse click commands either in the second or first modules such as single click, double click, click drags, right clicks, cut and paste and so on, in embodiments, so that the circuitry of the first module (the joystick) may need merely relay these commands to the computer, or may accept proprietary commands and translate them to standard mouse commands. Thus in other embodiments the function pad (second module) may generate its own set of commands, which the circuitry of the first module then translates into the appropriate standard mouse commands.

For example a user who has access difficulty with "click and drag" might program a first touch sensitive area on the function pad to serve as the "click" portion of the click and drag command, but without the necessity to maintain the "click". Instead, a second touch sensitive area might be read by the first module as the "end button hold-down", thus ending the click and drag operation. Even the same touch area might be used, so that a first click causes the click and drag to start and a second click causes it to end.

Different individuals will have different accessibility issues. Thus, while the scheme above might work for a user having a "click and drag" issue, it might not be appropriate for one whose main interest is precision placement of the cursor during clicking. This second user might instead program the device so that first touch zone "freezes" the joystick, and the first module does not send any cursor motion commands to the computer, while a second touch zone actually clicks at that location. Or, the same user might use touch zones to adjust sensitivity of the joystick device, so that it becomes easier to make small cursor motions when a given touch zone is/has been activated. A third user whose issue is the difficulty of quick "double clicking" might use yet a fourth programming schema in which one touch to one zone causes the modules to send a double click.

On device programmability is one important feature of the present invention. Programmability in the software of the computer, by means of drivers, is obviously a normal short-cut for fancy "gaming" joysticks or other alternative analog input devices. However, this short-cut comes with a disadvantage. In particular, the unitary device of the invention is no longer truly portable in such an embodiment. In the presently preferred embodiment, the user may freely program the device at the first module, or in other alternative embodiments at the second module, so that the device always mimics a standard mouse. Portability is thus assured: the device may be unplugged from one computer and plugged into another, and in all cases it appears to the computer that a standard mouse is in use.

The circuitry of the first module may be in embodiments located in other modules of the invention: split between the two modules, in the second module, etc.

This disclosure is provided to allow practice of the invention by those skilled in the art without undue experimentation, including the best mode presently contemplated and the presently preferred embodiment. Nothing in this disclosure is to be taken to limit the scope of the invention, which is susceptible to numerous alterations, equivalents and substitutions without departing from the scope and spirit of the invention. The scope of the invention is to be understood from the claims accompanying this application.

I claim:

1. A computer pointing device for use on a work surface by a human user located facing the work surface, the pointing device comprising: a first module disposed at a first position corresponding to the natural rest position of such human user's first hand on such work surface wherein the first module further comprises mouse pointing circuitry operative to transmit to the computer standard signals associated with the pointing of a joystick; a substantially flat second module disposed at a second position corresponding to the natural rest position of such human user's second hand on such work surface wherein the second module further comprises mouse click circuitry operative to transmit to the computer standard signals associated with all of the clicking of a standard mouse; the first and second modules being operatively electrically connected to a first computer input port; the first module having a pointing mechanism; and the second module having a plurality of touch sensitive devices thereon; wherein the second module further comprises mouse click circuitry operative to transmit to the computer standard signals associated with all of the clicking of a standard mouse wherein the operative connections further comprise one member selected from the group consisting of:

i) a first cable carrying the standard joystick pointing signals from the first module and a second cable carrying the standard mouse click signals from the second module, the first and second cables merging prior to the first computer input port, the combined length of the two cables greater than the length of a standard computer keyboard, ii) a first cable carrying the standard joystick pointing signals and also standard left-click mouse click signals from the first module, a second cable carrying the clicking signals from the second module, the first and second cables merging prior to the first computer input port, the combined length of the two cables greater than the length of a standard computer keyboard.

2. The pointing device of claim 1, wherein the first module comprises a base part and a manipulable part, and wherein pressure applied to the manipulable part generates standard signals associated with the pointing function of a standard mouse, and wherein the base part comprises a generally mouse-shaped housing.

3. The pointing device of claim 1, wherein the first computer pointing device input port on such computer further comprises one member selected from the group consisting of: USB port, RS-232, RS-232 variant, large PS/2 mouse port, small PS/2 mouse port, Firewire, IEEE-1394, any other standard computer port now known or later developed, and combinations thereof.

4. The pointing device of claim 1, wherein the first module base part further comprises:
a first scroll wheel.

5. The pointing device of claim 1, wherein the second module base part further comprises:
a first scroll wheel.

6. The pointing device of claim 1, wherein the second module further comprises a wrist support.

7. The pointing device of claim 1, wherein the second module is substantially flat.

8. The computer pointing device of claim 1, further comprising a third module having joystick pointing circuitry and mouse click circuitry operative to transmit to the computer standard signals associated with the pointing of a joystick and clicking of a mouse.

9. The computer pointing device of claim 1, further comprising joystick pointing circuitry and mouse click circuitry operative to transmit to the computer standard signals associated with the pointing of a joystick and clicking of a mouse, the joystick pointing circuitry and mouse click circuitry both located in one member selected from the group consisting of: the first module, the second module.

10. The computer pointing device of claim 1, wherein the pointing mechanism of the first module further comprises:
a base unit having an aperture in one surfaces the aperture having pointing sensing units disposed therein;
a stylus unit dimensioned and configured to partially enter the aperture, whereby when the stylus is inserted into the aperture and moved, the pointing sensing units sense the motion of the stylus, whereby the stylus, when inserted into the aperture of the base unit, comprises a joystick.

11. A computer pointing device for use on a work surface by a human user located facing the work surface, the pointing device comprising: a first module disposed on such work surface wherein the first module further comprises mouse pointing circuitry operative to transmit to the computer standard signals associated with the pointing of a joystick; a second module disposed on such work surface wherein the second module further comprises mouse click circuitry operative to transmit to the computer standard signals associated with all of the clicking of a standard mouse; the first and second modules having an operative connection to each other; one module having a computer pointing device thereon while the other module having a first touch sensitive device thereon; the second module transmitting to the first module signals relating to click commands, the second module sending standard mouse click commands to the computer via a second operative connection wherein the operative connection further comprise one member selected from the group consisting of:
i) a first cable carrying the standard joystick pointing signals from the first module and a second cable carrying the standard mouse click signals from the second module, the first and second cables merging prior to the first computer input port, the combined length of the two cables greater than the length of a standard computer keyboard,
ii) a first cable carrying the standard joystick pointing signals and also standard left-click mouse click signals from the first module, a second cable carrying the clicking signals from the second module, the first and second cables merging prior to the first computer input port, the combined length of the two cables greater than the length of a standard computer keyboard.

12. The computer pointing device of claim 11, wherein the first module is disposed on such work surface at the natural rest position of a user's hand upon such work surface.

13. The computer pointing device of claim 11, wherein the second module is disposed on such work surface at the natural rest position of a user's hand upon such work surface.

14. The computer pointing device of claim 1, wherein the first module also has a touch sensitive device operatively connected to the circuitry of the second module to transmit to the computer standard signals associated with the "left click" of a standard mouse.

15. The computer pointing device of claim 1, wherein the first module also has a touch sensitive device operatively connected to left-click circuitry within the first module operatively connected to transmit signals associated with the "left click" of a mouse to such computer.

* * * * *